us010371712B2

(12) United States Patent
Boro et al.

(10) Patent No.: US 10,371,712 B2
(45) Date of Patent: Aug. 6, 2019

(54) SPEED SENSOR ASSEMBLY

(71) Applicant: Polaris Industries Inc., Medina, MN (US)

(72) Inventors: Jonathan V. S. Boro, Medina, MN (US); Geoffrey Wotton, Medina, MN (US)

(73) Assignee: Polaris Industries Inc., Medina, MN (US)

( * ) Notice: Subject to any disclaimer, the term of this patent is extended or adjusted under 35 U.S.C. 154(b) by 469 days.

(21) Appl. No.: 14/967,514

(22) Filed: Dec. 14, 2015

(65) Prior Publication Data

US 2016/0091523 A1    Mar. 31, 2016

Related U.S. Application Data

(62) Division of application No. 13/719,137, filed on Dec. 18, 2012, now Pat. No. 9,244,090.

(51) Int. Cl.
| | |
|---|---|
| *H01R 43/00* | (2006.01) |
| *H05K 13/00* | (2006.01) |
| *G01P 3/44* | (2006.01) |
| *G01P 3/487* | (2006.01) |

(52) U.S. Cl.
CPC ............... *G01P 3/44* (2013.01); *G01P 3/487* (2013.01); *Y10T 29/49117* (2015.01); *Y10T 29/49169* (2015.01)

(58) Field of Classification Search
CPC . H01B 3/30; G01P 1/026; G01P 3/487; G01P 3/443; Y10T 29/49117; Y10T 29/49169; H01R 13/5202; H01R 13/5205; H01R 13/64; H01R 2201/26

USPC .......... 29/854, 825, 831, 832, 841, 855, 856
See application file for complete search history.

(56) References Cited

U.S. PATENT DOCUMENTS

| | | | | |
|---|---|---|---|---|
| 5,121,289 | A * | 6/1992 | Gagliardi | G01D 5/147 174/522 |
| 5,631,557 | A * | 5/1997 | Davidson | G01D 11/245 324/174 |
| 6,702,595 | B2 | 3/2004 | Nelson | |
| 8,182,393 | B2 | 5/2012 | Gillingham | |
| 8,256,549 | B2 | 9/2012 | Crain | |
| 8,272,792 | B2 * | 9/2012 | Coleman | G02B 6/3887 385/139 |
| 8,302,724 | B2 | 11/2012 | Gillingham | |
| 8,480,538 | B2 | 7/2013 | Gillingham | |
| 8,517,136 | B2 | 8/2013 | Hurd | |
| 8,534,397 | B2 | 9/2013 | Grajkowski | |
| 8,534,413 | B2 | 9/2013 | Nelson | |
| 8,543,306 | B2 | 9/2013 | Utke | |

(Continued)

OTHER PUBLICATIONS

Honeywell GT1 Series Hall Effect Gear Tooth Sensors, Jan. 1, 1998; 3 pages.

(Continued)

*Primary Examiner* — Thiem D Phan
(74) *Attorney, Agent, or Firm* — Faegre Baker Daniels LLP

(57) ABSTRACT

A robust and compact speed sensor assembly that includes a Hall effect sensor with protective circuitry in a compact housing that can be attached to the wheel of a motorcycle in the vicinity of the brake rotor to present the sensor Hall plate in a proper transverse-to-target orientation to detect passing targets, such as the brake rotor mounting bolts or magnets.

13 Claims, 3 Drawing Sheets

(56) References Cited

U.S. PATENT DOCUMENTS

| | | |
|---|---|---|
| 8,682,550 B2 | 3/2014 | Nelson |
| 8,930,109 B2 | 1/2015 | Utke |
| 8,994,494 B2 | 3/2015 | Koenig |
| 9,075,699 B2 | 7/2015 | Wetterlund |
| 9,151,384 B2 | 10/2015 | Kohler |
| 9,152,607 B2 | 10/2015 | Wetterlund |
| 9,162,573 B2 | 10/2015 | Grajkowski |
| 9,216,637 B2 | 12/2015 | Crain |
| 9,244,090 B2 | 1/2016 | Boro |
| 9,381,810 B2 | 7/2016 | Nelson |
| 9,429,235 B2 | 8/2016 | Krosschell |
| 2004/0050180 A1 | 3/2004 | Abe |
| 2004/0257067 A1 | 12/2004 | Mattson |
| 2005/0231197 A1 | 10/2005 | Reininger |
| 2006/0232931 A1 | 10/2006 | Obermaier |
| 2007/0050095 A1 | 3/2007 | Nelson |
| 2007/0178717 A1 | 8/2007 | Harshman |
| 2008/0018269 A1 | 1/2008 | Wyatt |
| 2009/0166108 A1 | 7/2009 | Gross |
| 2011/0239780 A1 | 10/2011 | Berger |
| 2011/0297462 A1 | 12/2011 | Grajkowski |
| 2012/0125106 A1 | 5/2012 | Mai |
| 2013/0096785 A1 | 4/2013 | Kohler |

OTHER PUBLICATIONS

Melexis MLX90217, Hall-Effect Geartooth Sensor, Mar. 1, 2012; 9 pages.
Gill Sensors, Speed Sensor, Jan. 1, 2011; 2 pages.
Allegro MicroSystems, Inc.: Application Information: "Position and Level Sensing Using Hall Effect Sensing Technology", Jan. 1, 2006; 7 pages.

* cited by examiner

SPEED SENSOR ASSEMBLY

CROSS REFERENCE TO RELATED APPLICATION

This application is a divisional of U.S. application Ser. No. 13/719,137, filed on Dec. 18, 2012, now U.S. Pat. No. 9,244,090.

BACKGROUND INFORMATION

This invention relates to a compact, accurate and robust speed sensor for motorcycles, all-terrain vehicles (ATVs), and the like.

Mechanisms for determining the speed of a motorcycle or ATV typically involve sensing the rotational speed of a wheel. The sensed information is conducted to a meter for display, typically as linear velocity in units such as miles per hour.

A preferable location for sensing the wheel speed is near the hub. The main component of the sensor is fixed in place on the fork, for example, or on a stationary (that is, not rotating) bracket to which the brake caliper is fastened. The main component of the sensor is thus positioned to detect the motion of one or more small, magnet "targets" that are carried on the brake rotor and located to pass by the sensor as the wheel rotates.

Space for attaching the stationary component of the sensor is quite limited, so a small sensor is necessary. It is also desirable to configure the sensor so that it remains intact, in place and functional, especially when used on an off-road type of motorcycle or ATV where the sensor may be subjected to potentially damaging elements such as shock, water, mud, brush, etc. In short, it is desirable to use a speed sensor that is compact and robust.

One prior approach to sensing wheel rotation speed provides a hollow, metallic housing within which a reed switch is located. The housing includes external threads and a cylindrical internal bore. The housing may thus be in the form of a hollow bolt that can be threaded into a corresponding threaded aperture near the hub. The reed switch is an electrical switch operated by an applied magnetic field. The switch consists of a pair of contacts on ferrous metal reeds in an airtight glass envelope. The contacts are normally open, making no electrical contact. The switch is actuated (closed) when a magnet that is carried on the brake rotor is moved near the switch. Once the magnet moves past, the reed switch returns to its open state. Leads that extend from the reed switch are connected to wires that are inside of a cable that extends from one end of the housing to a meter or computer on the motorcycle where the vehicle speed is calculated and displayed.

While the reed switch-type speed sensor just described has the attribute of compactness, it is insufficiently reliable, primarily because of the requirement for somewhat delicate moving parts: the thin metal reeds.

Another type of sensor, known as a Hall effect sensor, can be employed for sensing wheel rotational speed. Hall effect sensors include a planar conductor, or Hall plate, along which a current is applied. Variations in the magnetic flux through the plate produce a voltage across the plate that is directly related to the flux density. The magnetic flux density variations can be provided by a magnet that moves past the plate. Alternatively, the Hall plate can be biased with a magnet so that the flux is varied by a ferrous target that moves past the plate through the magnetic field.

Some Hall effect sensors are available in integrated circuit (IC) packages. Such packages are typically planar in shape and have a flat face that must be oriented so that it is generally parallel to, and in close proximity with, the path of the target as it moves across the plate. For convenience, this orientation of the Hall plate relative to the target path will be here referred to as the "transverse-to-target" orientation.

While such Hall effect sensors are generally more reliable than reed switches, they can be made more robust if they include additional protective circuitry for use of the sensor in a severe environment or with an electrical system that is exposed to potentially damaging voltage excursions.

The present invention is directed to a robust Hall effect sensor that includes such protective circuitry and is assembled within a compact housing that can be attached to the wheel in the vicinity of the brake rotor to present the sensor Hall plate in a proper transverse-to-target orientation to detect passing targets, such as the brake rotor mounting bolts.

Other advantages and features of the present invention will become clear upon study of the following portion of this specification and drawings.

DETAILED DESCRIPTION

Figure 9:
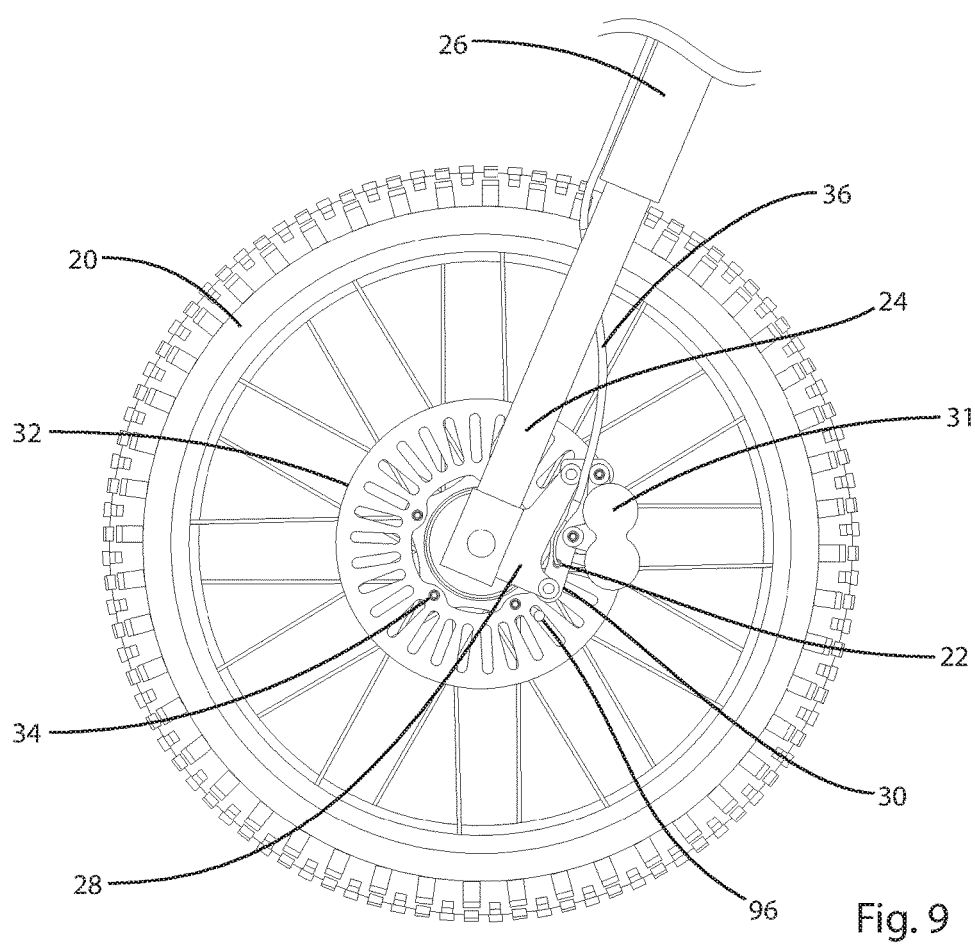
FIG. 9 is a side view of a wheel of a motorcycle with which the speed sensor assembly of present invention may be used.

FIG. 9 depicts a side view of a wheel 20 of a motorcycle with which the speed sensor assembly 22 of present invention may be used. The wheel 20 is carried on a central hub that extends between the spaced-apart legs 24 of the motorcycle fork 26.

One fork leg 24 includes an attached rigid, metal extension 28, to which a brake caliper mounting bracket 30 is fastened. The brake pads of the caliper are applied to the disc or rotor 32 that is fastened to the rotating hub by bolts 34.

The speed sensor assembly 22 is mounted to the caliper mounting bracket 30 in an orientation that permits the Hall effect sensor component of the assembly to detect the presence of the heads of the ferrous bolts 34 as the bolts pass adjacent to the sensor. The output of the sensor assembly is conducted via a cable 36 to a meter or computer for display in units of velocity.

With reference to FIGS. 1-4, a preferred embodiment of a speed sensor assembly 22 includes a rigid, generally tubular housing 38 that may be formed of stainless steel, for example. At the outer end 40 of the housing 38, the exterior surface is threaded. The exterior of the mid-section 42 of the housing is hexagonal in cross section so that a wrench or other driver can be applied for threading the outer end 40 of the housing into a correspondingly threaded aperture in the brake caliper mounting bracket 30. In a preferred embodiment, the outer end 40 of the housing 38 is in the form of a hollow 8 mm bolt.

The housing 38 has a generally cylindrical bore 46 extending through it. The bore 46 has a longitudinal axis 44. When threaded into the aperture in the caliper mounting bracket 30, the longitudinal axis 44 is parallel to the axis of rotation of the wheel 20 so that the path of the passing rotor bolts 34 is in a plane that is perpendicular to the longitudinal axis 44 of the housing bore.

Figure 5:
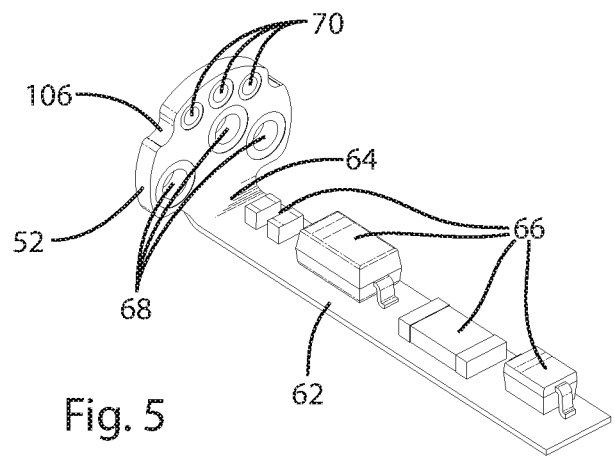
FIG. 5 is an enlarged perspective view of the joined circuit board and flexible circuit member components of the speed sensor assembly.

An annular, radially inwardly protruding shoulder 48 (FIG. 2) is formed in the bore 46 within the outer end 40 of the housing. One edge of a dielectric seating ring 50 is abutted against the shoulder 48. A rigid, planar printed circuit board (PCB) 52 is seated on the other edge of the seating ring 50 and thus constrained from moving further inwardly of the housing bore 46. An enlarged view of the PCB 52 appears in FIG. 5.

The rigid PCB 52 serves in part as a base for a back-biased, integrated circuit (IC) Hall effect sensor 54, and for connecting the sensor's three leads 56 (supply, ground and output) to the corresponding supply, ground and output termini 58 of the three-conductor cable 36. The PCB 52 also connects the sensor 54 with an associated severe-environment and electronic system protection circuit 60 (hereafter "protection circuit" FIG. 8, discussed more below). The three conductor cable termini 58 are connected to the PCB 52 at vias 68, and the three leads 56 from the sensor 54 are connected at adjacent vias 70 in the PCB 52.

The protection circuit 60 is provided on an elongated flexible printed circuit (FPC) 62 that has one end joined to the PCB 52 along a flat side edge region 64 of the PCB 52. At that edge region 64, the elongated FPC 62 is bent and extends away from the PCB 52 in a direction generally parallel to the longitudinal axis 44 of the housing bore 46. The electronic components 66 (FIG. 5) of the protection circuit 60 are mounted to the FPC 62 so that those components, as well as the elongated FPC 62 are compactly housed within the assembly in a generally linear orientation, parallel to the longitudinal axis 44.

Figure 6:
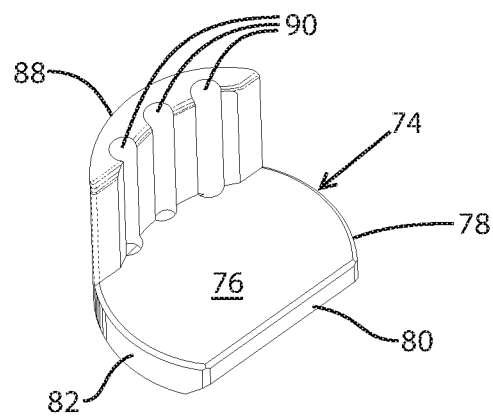
FIG. 6 is an enlarged perspective view of the support component of the speed sensor assembly.

The Hall effect sensor IC 54 and an associated permanent magnet 72 are secured within the housing bore 46 by a dielectric support 74 (see FIG. 6). Specifically, the sensor 54 has a generally planar back surface that is bonded to the flat surface that corresponds to the south pole of the permanent magnet 72. That opposite surface of the magnet 72 rests on a support surface 76 of a platform part 78 of the support 74.

As viewed from the end (that is, in the direction of the longitudinal axis 44 of the housing bore 46) the support 74 has a shape that generally conforms to that of the PCB 52, including a flat edge region 80 that aligns with the flat edge region 64 of the PCB 52. The platform part 78 of the support thus extends across the bore 46 of the housing, generally perpendicular to the longitudinal axis of the bore. The underside of the platform part (that is, the side facing the PCB 52) includes a peripheral edge that protrudes therefrom to define a support rim 82 (FIGS. 4 and 6) that contacts the corresponding peripheral edge of the PCB 52. That rim 82 thus defines a space between the platform part 78 and PCB 52 to provide clearance for the soldered ends of the leads 56 and cable termini 58 that may protrude from the surface of the PCB 52. Preferably, the rim 82 also includes a radially inwardly protruding lip 86 (FIG. 2) that contacts the magnet-facing surface of the PCB 52 to enhance the stability of the support 74 against the PCB 52.

On one edge of the platform part 78, the support 74 includes a riser 88 (FIGS. 3 and 6) that extends away from that part along one side of the magnet 72. The riser 88 has formed in it three channels 90 within each of which is received a lead 56 that extends from the Hall effect sensor 54 to the PCB 52. The riser 88 is dielectric to insulate those leads from each other and from the conductive wall of the housing bore 46.

Figure 3:
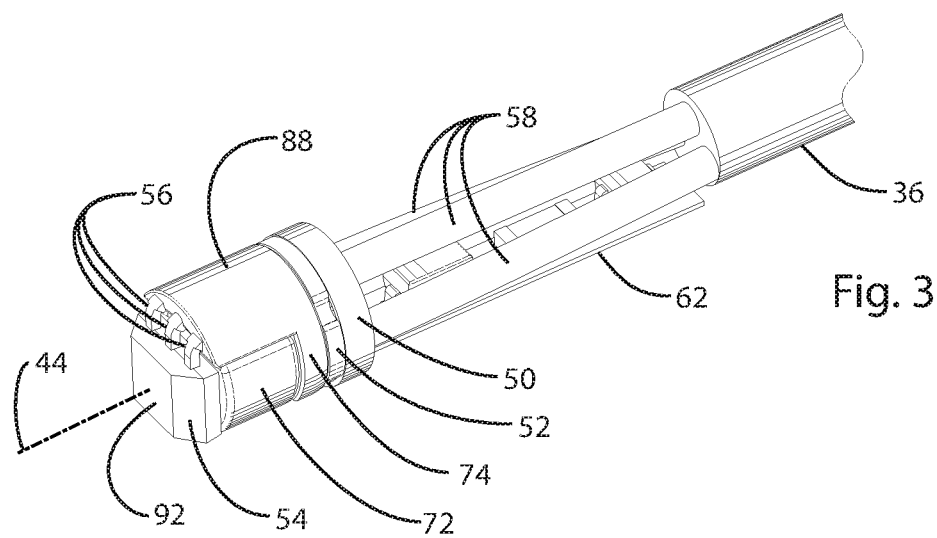
FIG. 3 is an enlarged perspective view of the speed sensor assembly removed from its housing.
Figure 4:
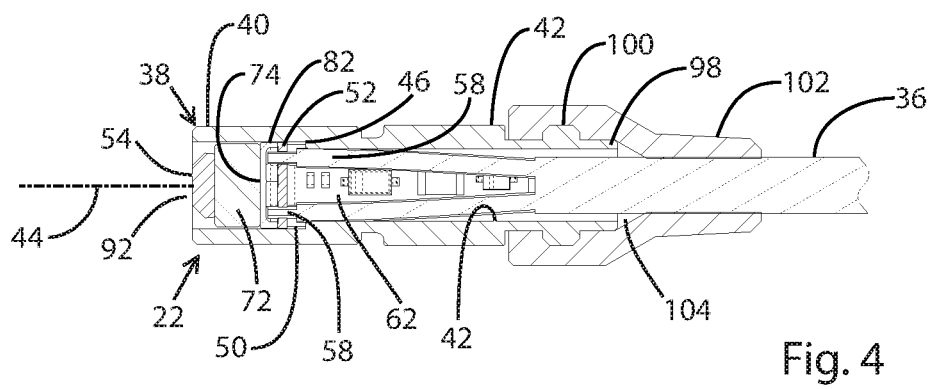
FIG. 4 is a cross sectional view taken along lines 4-4 of FIG. 1.

With particular reference to FIGS. 3 and 4, the Hall effect sensor IC 54 includes a planar outer surface 92 that covers the Hall plate of the sensor. The surface 92, hence the Hall plate, is arranged in the transverse-to-target orientation relative to the passing targets (that is, the heads of the rotor bolts 34) when the housing 38 is threaded into the aperture in the caliper mounting bracket 30 as noted above.

Figure 8:
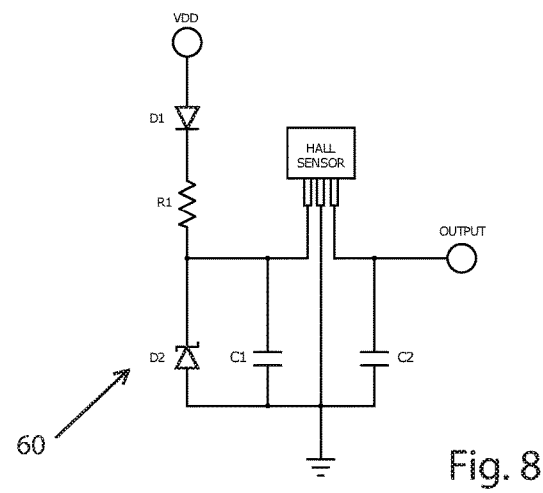
FIG. 8 is a circuit diagram of a preferred protection circuit that is employed with the speed sensor assembly.

One Hall effect sensor that is usable with the speed sensor assembly 22 of the present invention is that manufactured by NV Melexis SA as model number MLX90217. A suitable protection circuit 60 is shown in FIG. 8, where R1=5.6 kΩ, C1=10 nF, and C2=2.2 nF. D1 is a diode providing reverse polarity protection, and D2 is a Zener diode (24 volts) that combines with R1 to provide voltage protection.

Figure 1:
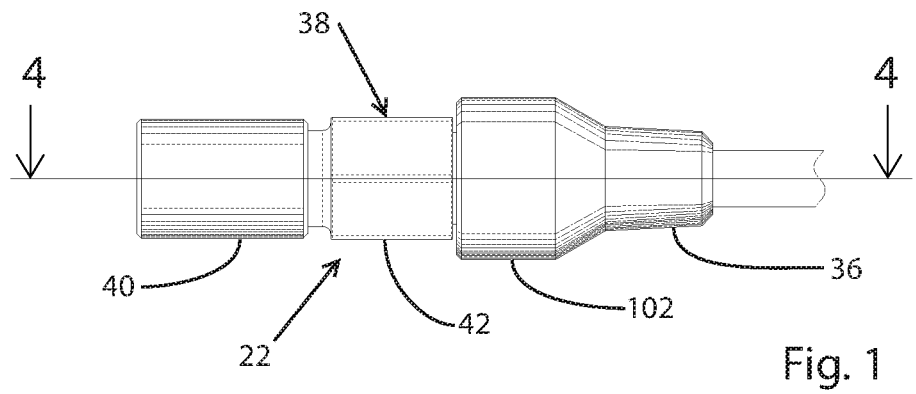
FIG. 1 is a side view of a speed sensor assembly formed in accordance with the present invention.
Figure 2:
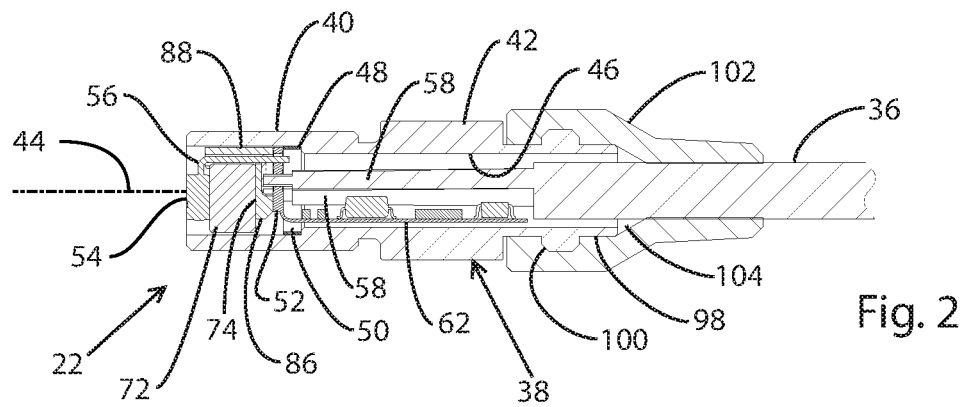
FIG. 2 is a vertical cross sectional view of the speed sensor assembly of FIG. 1.
Figure 7:
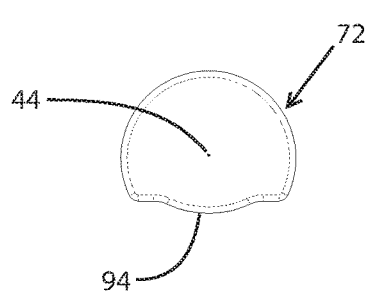
FIG. 7 is an end view of a magnet used with the speed sensor assembly.

The embodiment described above includes a permanent magnet 72 for back biasing the Hall plate to thereby provide a magnetic field to enhance the ability of the sensor to detect the relatively minor disturbance in the field due to the passage of the ferrous targets. The magnet may be a neodymium magnet, grade N45 or N50, for example, and preferably has a very thin epoxy coating. FIG. 7 shows an end view of a preferred magnet 72 as viewed from the end of the housing (that is, in the direction of the longitudinal axis 44 of the housing bore 46). The magnet 72 has a generally circular cross section but for a small, trimmed side 94 of the magnet. This trimmed side 94 provides room for the support riser 88 to extend between the magnet 72 and the inner wall of the housing bore 46 (FIG. 2). In this regard, the surface of the riser 88 that faces the magnet 72 is somewhat concave (FIG. 6), and the trimmed side 94 of the magnet 72 is contoured to be generally convex so that the magnet cross sectional shape occupies substantially the entire cross-sectional area of the outer end of the housing bore 46. This provides the maximum amount of flux through the Hall plate for a given grade of magnet and internal diameter of the housing bore.

As an alternative, the speed sensor assembly may be implemented without use of a magnet for back-biasing the Hall plate. In such an embodiment, the back surface of the Hall effect sensor IC 54 would be secured directly to the support surface 76 of the support 74 (with the riser 88 correspondingly shortened or eliminated), and one or more small magnets, such as shown at 96 in FIG. 9, are attached to the rotor for detection by the sensor 54. It is noteworthy that such magnets may also be used as targets with the back-biased embodiment described above.

At the inner end 98 of the assembly housing 38, the wall thickness is reduced but for an annular ridge 100 around which tightly fits one end of a tapered rubber boot 102 through which the cable 36 extends from the other end of the boot (FIG. 2). The boot 102 provides strain relief for the cable. To enhance the robustness of this cable-to-housing connection, epoxy is injected into the void 104 between the boot 102 and cable 36 to bond those components together. Upon curing, the epoxy serves as enhanced strain relief between the cable and housing to protect against damage or disconnection as a result of the elements noted above (shock, water, mud, brush, etc) that are common to the off-road vehicles with which the speed sensor assembly of the present invention is intended to be used.

Preferably, the entire speed sensor assembly is encapsulated in epoxy. To this end, the flat side edge region 64 of the PCB 52, the flat edge region 80 of the support, as well as a pair of small notches 106 in the otherwise rounded side edge of the PCB 52 (see FIG. 5) provide passages for movement of the liquid epoxy through the housing bore for complete encapsulation. In this regard, the inventors have found that injection of epoxy (as by a hypodermic-like needle) through the boot 102 for providing the enhanced strain relief discussed above can also be used for flooding the assembly with the encapsulating epoxy in the direction of the inner end 98 to the outer end 40 of the housing. This approach has the advantage (as compared to introducing epoxy inwardly from the outer end) of preventing the formation of air bubbles that would result in an inferior encapsulation or potting of the assembly components.

While the foregoing description was made in the context of preferred embodiments, it is contemplated that modifications to those embodiments may be made without departure from the invention as claimed.

The invention claimed is:

1. A method of assembling a speed sensor in a housing that has cylindrical bore with a longitudinal axis, the method comprising the steps of:
   seating a planar circuit board in the bore to extend across the longitudinal axis;
   joining one end of an elongated flexible circuit member to the circuit board so that the flexible circuit member extends therefrom in a direction generally parallel to the longitudinal axis;
   providing a dielectric support for positioning in the housing; and
   supporting a planar Hall effect sensor to extend across the longitudinal axis of the bore so that leads of the sensor extend from the sensor and through spaced apart channels in the dielectric support for connection with the circuit board.

2. The method of claim 1 including the step of providing the sensor with a Hall plate at a front surface of the sensor and arranging the Hall plate to extend perpendicular to the longitudinal axis of the housing bore.

3. The method of claim 1 including the step of supporting a magnet in the bore to abut a back surface of the sensor.

4. The method of claim 3 including the step of shaping the magnet so that it occupies substantially the entire cross-sectional area of the bore.

5. The method of claim 1 including the step of seating the planar circuit board in a plane that is generally perpendicular to the longitudinal axis of the housing, and shaping the circuit board to have a flat side edge at the junction of the flexible circuit member and the circuit board.

6. The method of claim 1 including the step of mounting electrical components on the flexible circuit member to form a functional electrical circuit with the leads of the sensor.

7. The method of claim 1 including the steps of: connecting to the circuit board the termini of a cable that extends from an inner end of the housing; and bonding to the cable a boot that fits around the inner end of the housing.

8. The method of claim 7 including the steps of: injecting epoxy into the inner end of the housing for bonding the boot and cable, and directing the epoxy through the housing bore to an outer end of the housing, thereby encapsulating the components of the assembled speed sensor.

9. A method of assembling a speed sensor in a housing that has cylindrical bore with a longitudinal axis, the method comprising the steps of:
   seating a planar circuit board in the bore to extend across the longitudinal axis;
   joining one end of an elongated flexible circuit member to the circuit board so that the flexible circuit member extends therefrom in a direction generally parallel to the longitudinal axis;
   providing a dielectric support for positioning in the housing;
   supporting a planar Hall effect sensor to extend across the longitudinal axis of the bore so that leads of the sensor extend from the sensor and through the dielectric support for connection with the circuit board;
   forming the housing to include an annular internal shoulder; and
   seating the circuit board on a dielectric seating ring that is located in the bore and abutting the internal shoulder.

10. A method of assembling a speed, the method comprising the steps of:
   providing a sensor housing that has a cylindrical bore with a longitudinal axis;
   seating a planar circuit board in the bore to extend across the longitudinal axis;
   joining one end of an elongated flexible circuit member to the circuit board so that the flexible circuit member extends therefrom in a direction generally parallel to the longitudinal axis;
   supporting a planar Hall effect sensor to extend across the longitudinal axis of the bore so that the leads of the sensor extend from the sensor and through a dielectric support for connection with the circuit board;
   forming the housing to include an annular internal shoulder; and
   seating the circuit board on a dielectric seating ring that is located in the bore and abutting the internal shoulder.

11. The method of claim 10, including the step of providing the sensor with a Hall plate at a front surface of the sensor and arranging the Hall plate to extend perpendicular to the longitudinal axis of the housing bore.

12. The method of claim 10, including the step of supporting a magnet in the bore to abut a back surface of the sensor.

13. The method of claim 12, including the step of shaping the magnet so that it occupies substantially the entire cross-sectional area of the bore.

* * * * *